(12) United States Patent
Ben Arzi et al.

(10) Patent No.: US 12,470,584 B1
(45) Date of Patent: Nov. 11, 2025

(54) TECHNIQUES FOR EFFECTIVE NETWORK EXPOSURE DETECTION OF PRIVATE ENDPOINTS THROUGH A CLOUD-NATIVE ROUTER

(71) Applicant: Wiz, Inc., New York, NY (US)

(72) Inventors: Ron Ben Arzi, Kyoto (JP); Ami Luttwak, Binyamina (IL); Shai Keren, Oporto (PT); Oron Noah, Geulim (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/217,401

(22) Filed: May 23, 2025

(51) Int. Cl.
  *H04L 9/40* (2022.01)
  *G06F 21/55* (2013.01)
(52) U.S. Cl.
  CPC ........ *H04L 63/1425* (2013.01); *G06F 21/554* (2013.01)
(58) Field of Classification Search
  CPC .......................... H04L 63/1425; G06F 21/554
  USPC ......................................................... 726/22
  See application file for complete search history.

(56) References Cited

U.S. PATENT DOCUMENTS

| | | | |
|---|---|---|---|
| 10,749,885 B1* | 8/2020 | Hoorvitch | H04L 63/08 |
| 10,764,313 B1* | 9/2020 | Mushtaq | G06N 20/00 |
| 11,546,360 B2* | 1/2023 | Woodford | G06N 20/00 |
| 11,831,420 B2 | 11/2023 | Kapelevich et al. | |
| 2021/0367935 A1* | 11/2021 | Dykes | H04L 63/0807 |
| 2024/0126632 A1* | 4/2024 | Habel | G06F 11/0772 |
| 2024/0346424 A1* | 10/2024 | Orzechowski | G06N 5/04 |
| 2025/0016190 A1* | 1/2025 | Rawat | H04L 41/22 |
| 2025/0080574 A1* | 3/2025 | Shua | H04L 63/1416 |

* cited by examiner

*Primary Examiner* — Badri Narayanan Champakesan
*Assistant Examiner* — Badri Champakesan
(74) *Attorney, Agent, or Firm* — M&B IP Analysts, LLC

(57) ABSTRACT

A system and method for detecting effective exposure of private API endpoints in a cloud computing environment is presented. The method includes inspecting a resource in a cloud computing environment utilizing agentless inspection; detecting a cybersecurity object on the inspected resource, the cybersecurity object indicating that the resource is a proxy-type appliance; detecting a private endpoint in the cloud computing environment, wherein the resource is configured to access the private endpoint, and the resource is further configured to access an external network, and wherein the external network is external to the cloud computing environment; determining that the private endpoint is potentially exposed via a network path which includes at least the resource; actively inspecting the network path to determine that the private endpoint is exposed to the external network; and initiating a remediation action based on a result of the active inspection.

15 Claims, 9 Drawing Sheets

TECHNIQUES FOR EFFECTIVE NETWORK EXPOSURE DETECTION OF PRIVATE ENDPOINTS THROUGH A CLOUD-NATIVE ROUTER

TECHNICAL FIELD

The present disclosure relates generally to detection of private endpoints, and specifically to detecting effective network exposure of private endpoints in a cloud computing environment through a cloud-native routing system.

BACKGROUND

Effective network exposure refers to the portion of a computer network or system that is accessible to potential attackers, whether intentionally or unintentionally. This includes open ports, accessible services, misconfigured interfaces, and any other elements that allow unsolicited interaction from outside sources. What makes this exposure "effective" is not merely its existence, but its practical reachability and potential for exploitation by unauthorized users.

A problem with effective network exposure lies in the way modern systems are structured. Today's networks are highly complex, distributed, and dynamic, often spanning on-premises environments, multiple cloud providers, and countless interconnected services. This complexity creates blind spots. Security teams cannot always maintain a real-time, accurate inventory of what is exposed and how those exposures behave under different conditions. A single misconfiguration, such as a forgotten cloud service, an open SSH port, a legacy application still online, etc., can become an attack vector with devastating consequences.

Despite significant investment in security tools and practices, effective exposure remains a persistent problem because many solutions focus on static conditions. Vulnerability scanners, for instance, may detect known flaws but often fail to reflect how those flaws interact within live, layered infrastructures. Firewalls and access controls can be bypassed if not meticulously configured and maintained. Moreover, many systems rely on snapshots or scheduled assessments rather than continuous visibility, leaving critical exposure undetected in between scans. Contextual understanding is also lacking. For example, tools may flag an open port but not assess whether it is reachable from the internet or exploitable in context. This leads to alert fatigue or false confidence, both of which hinder response efforts.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include inspecting a resource in a cloud computing environment utilizing agentless inspection. The method may also include detecting a cybersecurity object on the inspected resource, the cybersecurity object indicating that the resource is a proxy-type appliance. The method may furthermore include detecting a private endpoint in the cloud computing environment, where the resource is configured to access the private endpoint, and the resource is further configured to access an external network, and where the external network is external to the cloud computing environment. The method may in addition include determining that the private endpoint is potentially exposed via a network path which includes at least the resource. The method may moreover include actively inspecting the network path to determine that the private endpoint is exposed to the external network. The method may also include initiating a remediation action based on a result of the active inspection. Other embodiments of this aspect include corresponding computer systems, apparatus, and computer programs recorded on one or more computer storage devices, each configured to perform the actions of the methods.

Implementations may include one or more of the following features. The method may include: actively inspecting the network path after initiating the remediation action; determining that the private endpoint is still exposed; and initiating a second remediation action. The method may include: inspecting the resource for a second cybersecurity object, the second cybersecurity object indicating a cybersecurity risk; detecting the cybersecurity object; and initiating the remediation action further based on the cybersecurity risk. The method may include: detecting the private endpoint in a cloud log of the cloud computing environment, where the cloud log includes a plurality of event records, and where at least an event record includes a network address of the private endpoint. The method may include: detecting in a network log of the cloud computing environment a data record indicating communication between the resource and the private endpoint. The method where actively inspecting the network path further may include: generating a network access instruction; and executing the network access instruction on a network path including the external network. The method may include: determining that the private endpoint is exposed based on a reply received from executing the network access instruction. The method may include: executing the network access instruction on a plurality of network paths, each including a different external network component. The method may include: determining that the resource is a proxy-type based on detecting the cybersecurity object and further based on detecting a configuration of the proxy-type appliance. Implementations of the described techniques may include hardware, a method or process, or a computer-tangible medium.

In one general aspect, a non-transitory computer-readable medium may include one or more instructions that, when executed by one or more processing circuitries of a device, cause the device to: inspect a resource in a cloud computing environment utilizing agentless inspection; detect a cybersecurity object on the inspected resource, the cybersecurity object indicating that the resource is a proxy-type appliance; detect a private endpoint in the cloud computing environment, where the resource is configured to access the private endpoint, and the resource is further configured to access an external network, and where the external network is external to the cloud computing environment; determine that the private endpoint is potentially exposed via a network path which includes at least the resource; actively inspect the network path to determine that the private endpoint is exposed to the external network; and initiate a remediation action based on a result of the active inspection. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: The system inspect a resource in a cloud computing environment utilizing agentless inspection. The system may in addition detect a cybersecurity object on the inspected resource, the cybersecurity object indicating that the resource is a proxy-type appliance. The system may moreover detect a private endpoint in the cloud computing environment, where the resource is configured to access the private endpoint, and the resource is further configured to access an external network, and where the external network is external to the cloud computing environment. The system may also determine that the private endpoint is potentially exposed via a network path which includes at least the resource. The system may furthermore actively inspect the network path to determine that the private endpoint is exposed to the external network. The system may in addition initiate a remediation action based on a result of the active inspection. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: actively inspect the network path after initiating the remediation action; determine that the private endpoint is still exposed; and initiate a second remediation action. The system where the memory contains further instructions which when executed by the processing circuitry further configure the system to: inspect the resource for a second cybersecurity object, the second cybersecurity object indicating a cybersecurity risk; detect the cybersecurity object; and initiate the remediation action further based on the cybersecurity risk. The system where the memory contains further instructions which when executed by the processing circuitry further configure the system to: detect the private endpoint in a cloud log of the cloud computing environment, where the cloud log includes a plurality of event records, and where at least an event record includes a network address of the private endpoint. The system where the memory contains further instructions which when executed by the processing circuitry further configure the system to: detect in a network log of the cloud computing environment a data record indicating communication between the resource and the private endpoint. The system where the memory contains further instructions that, when executed by the processing circuitry for actively inspecting the network path, further configure the system to: generate a network access instruction; and execute the network access instruction on a network path including the external network. The system where the memory contains further instructions which when executed by the processing circuitry further configure the system to: determine that the private endpoint is exposed based on a reply received from executing the network access instruction. The system where the memory contains further instructions which when executed by the processing circuitry further configure the system to: execute the network access instruction on a plurality of network paths, each including a different external network component. The system where the memory contains further instructions which when executed by the processing circuitry further configure the system to: determine that the resource is a proxy-type based on detecting the cybersecurity object and further based on detecting a configuration of the proxy-type appliance. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
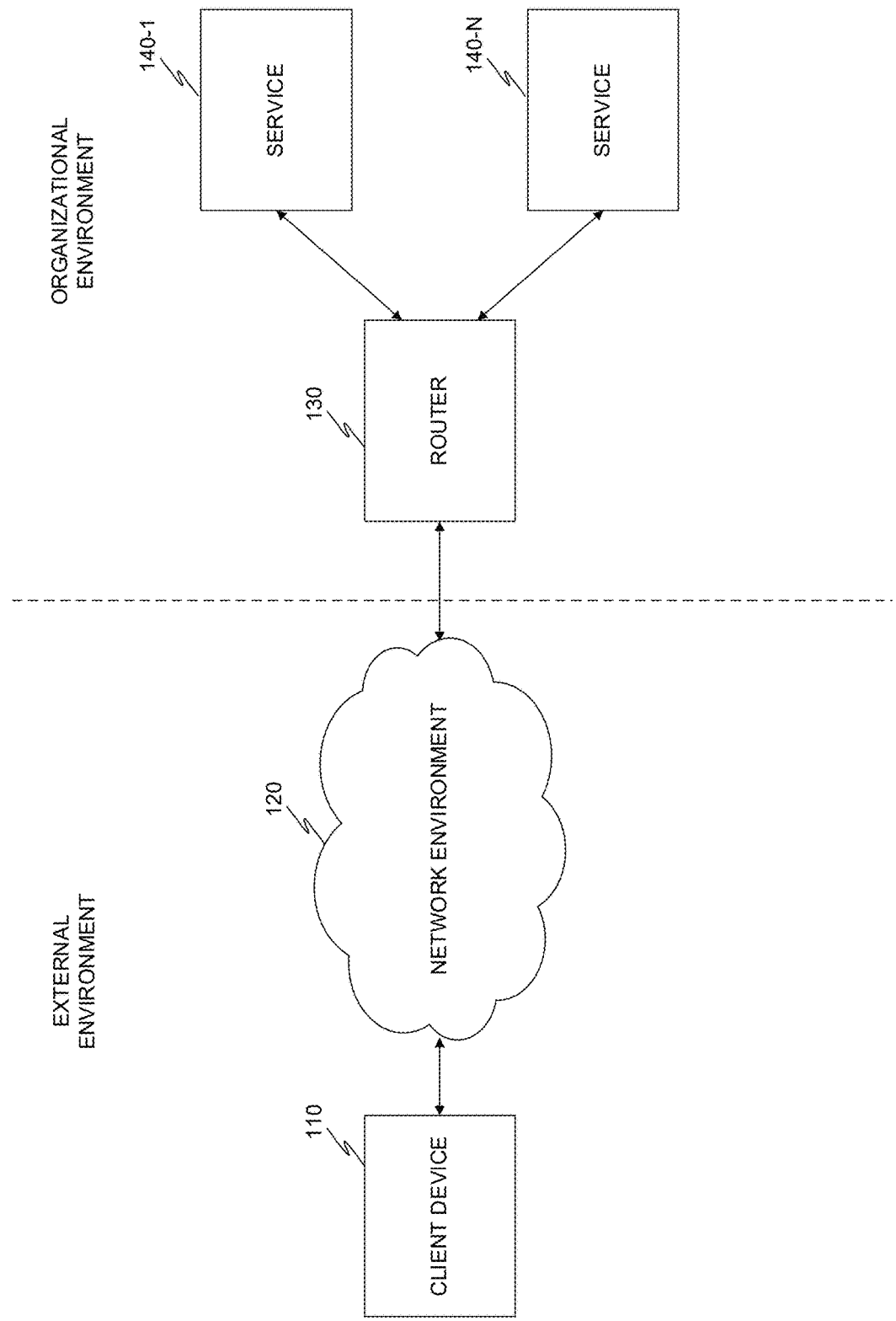
FIG. 1 is an example network communication diagram between an external environment and an organizational environment utilizing a cloud computing software router, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network communication diagram between an external environment and an organizational environment utilizing a cloud computing software router, utilized to describe an embodiment.

In an embodiment, an organizational environment is a computing environment which is controlled by, assigned to, etc., an organization. For example, in an embodiment, the computing environment is a cloud computing environment, an on-prem computing environment, a hybrid computing environment, various combinations thereof, and the like.

According to an embodiment, the organization environment includes a software router 130 (also referred to as router 130) which provides access to a plurality of software services 140-1 through 140-N, referred to individually as software service 140, and collectively as software services 140, where 'N' is an integer having a value of '2' or greater.

In an embodiment, a router 130 is a cloud native router. In some embodiments, a cloud native router is a distributed, software-defined system that orchestrates network traffic routing, load balancing, security, and policy enforcement across microservices and external clients. In certain embodiments, the router 130 operates at multiple layers of the network stack, adapting dynamically to containerized infrastructure, serverless infrastructure, and the like. For example, in an embodiment, a router 130 is integrated into platforms such as Kubernetes®, service meshes, cloud provider networks, a combination thereof, and the like.

In an embodiment, the router 130 includes an API Gateway, such as Amazon® Web Service (AWS) API Gateway, Kong®, and the like, which serves as the primary ingress point for client requests. In some embodiments, a client request is received over a network 120, such as the Internet, from a client device 110.

In some embodiments, the router 130 is configured to perform request routing, rate limiting, authentication, protocol translation, a combination thereof, and the like. For example, protocol translation includes, according to an embodiment, converting external REST calls, gRPC calls, and the like, into internal service calls. For example, in a Kubernetes® environment, the API Gateway is configured to receive HTTPS requests from a client device 110, authenticate them using JWT tokens, apply throttling policies, and route them to the appropriate backend microservice (such as service 140-1) via internal service discovery mechanisms.

In some embodiments, the router 130 includes a proxy, such as Envoy®, HAProxy®, NGINX®, and the like, which is configured to operate at the Layer 4 (TCP) or Layer 7 (HTTP) level. In an embodiment, a proxy is configured to provide advanced routing, load balancing, and observability features. In a service mesh setup such as Istio®, sidecar proxies are configured to intercept and route traffic between microservices transparently, enforcing policies and collecting telemetry data.

Additionally, in certain embodiments, the router 130 includes a firewall, such as Azure® Network Security Groups, GCP Firewall Rules, and the like, to control traffic based on IP ranges, ports, and protocols. A firewall is configured to operate primarily at the network layer to block unauthorized traffic before it reaches any application layer components.

In some embodiments, the router 130 includes a Web Application Firewall (WAF). AWS WAF, Cloudflare WAF, and the like, are configured to inspect HTTP requests to detect and block threats such as SQL injection, cross-site scripting, bot traffic, and the like. Unlike traditional firewalls, a WAF is configured to interpret the structure of web traffic and is configured to enforce rules based on URIs, headers, cookies, a combination thereof, and the like.

In an embodiment, the organizational environment includes additional software tools and services as part of the router 130 infrastructure. For example, service discovery mechanisms (such as Consul® or Kubernetes DNS), ingress controllers (such as NGINX or Traefik®), and TLS termination proxies. These components work together to ensure secure, scalable, and observable routing across the distributed services in a cloud-native architecture. For instance, a request might enter through an AWS ALB (Application Load Balancer), be routed to a Kubernetes Ingress controller, validated by an Istio-enabled Envoy sidecar, and finally reach a backend Pod, all while being monitored, authenticated, and logged along the way.

Figure 2:
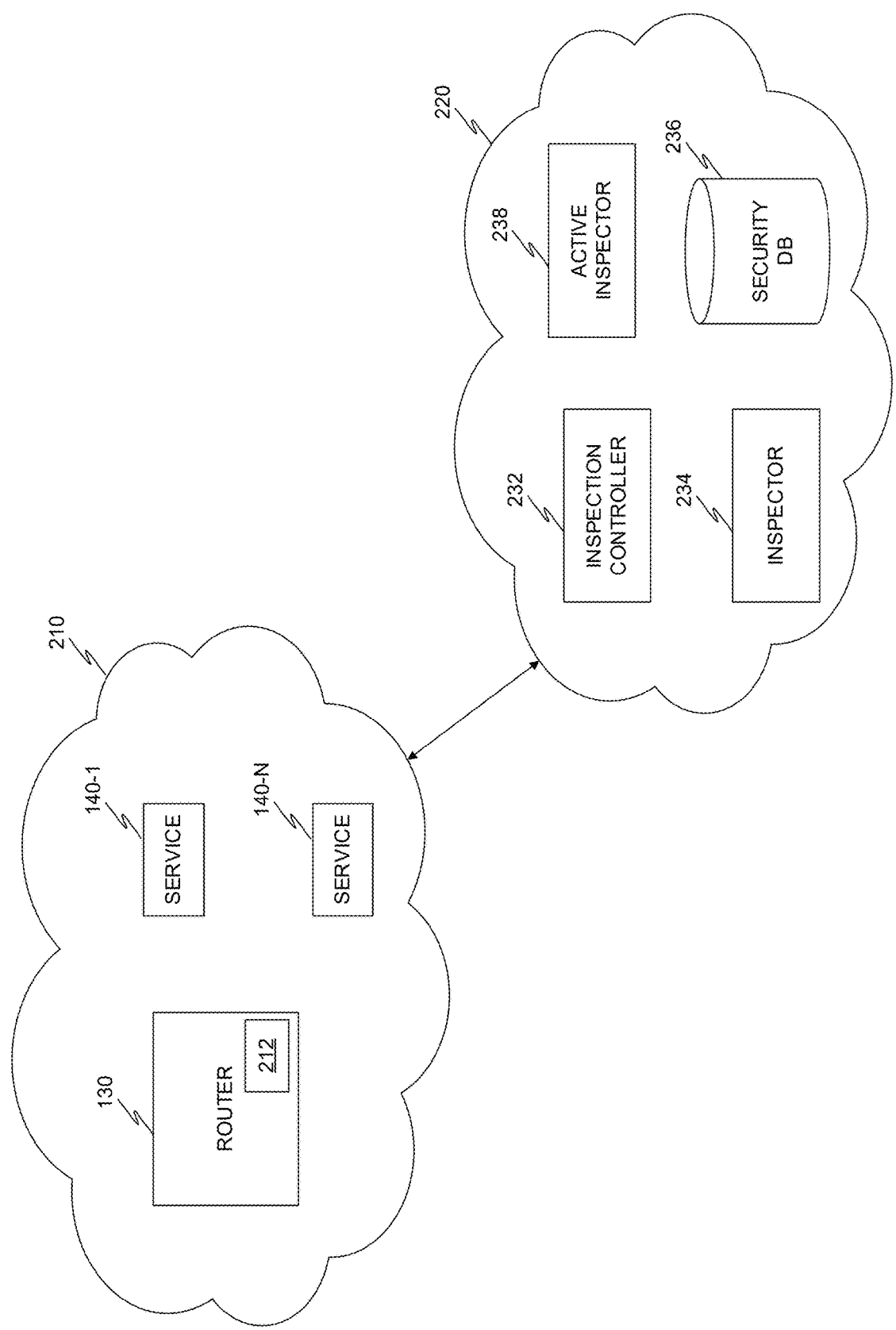
FIG. 2 is an example network illustration of a cloud computing environment and an inspection environment, implemented in accordance with an embodiment.

FIG. 2 is an example network illustration of a cloud computing environment and an inspection environment, implemented in accordance with an embodiment. In an embodiment, a cloud computing environment 210 is implemented as the organizational environment of FIG. 1 above. In some embodiments, the cloud computing environment includes a virtual private cloud (VPC), a virtual network (VNet), a virtual private network (VPN), a subnet, a combination thereof, and the like.

In an embodiment, the cloud computing environment 210 is deployed on a cloud service provider (CSP) infrastructure, such as Amazon® Web Service (AWS), Google® Cloud Platform (GCP), Microsoft® Azure, and the like. In an embodiment, the cloud computing environment 210 is deployed across multiple CSPs.

According to an embodiment, the cloud computing environment 210 includes a plurality of software service 140-1 through 140-N, referred to individually as software service 140, and collectively as software services 140, where 'N' is an integer having a value of '2' or greater.

In an embodiment, a software service 140 is a web server, a database, a distributed database, a storage, a repository, a knowledge base, and the like. In some embodiments, the router 130 is a cloud native router. In an embodiment, the router includes an API gateway, a reverse proxy, a service mesh, an ingress controller, a firewall, a WAF, various combinations thereof, and the like.

According to an embodiment, an API Gateway is configured to receive external client requests, and handle functions such as authentication, rate limiting, and protocol translation. For example, Amazon API Gateway is configured to define RESTful endpoints that securely forward requests to AWS Lambda® functions (i.e., serverless functions), internal services running in an elastic container service (ECS) cluster, and the like.

In an embodiment, a reverse proxy component is configured to provide low-level routing and load balancing, forwarding client traffic to appropriate software services 140 based on rules defined at the HTTP level, TCP level, a combination thereof, and the like. Envoy, for example, is a proxy that is configured to route traffic within a service mesh, performing tasks such as header-based routing, circuit breaking, and the like.

In some embodiments, a service mesh of a router 130 underpins microservice communication, handling internal routing, telemetry, and security transparently through sidecar proxies. Istio is an example that uses Envoy as its data plane, managing service-to-service traffic while applying policies for retries, timeouts, and mTLS encryption.

In certain embodiments, an ingress controller is configured to integrate with container orchestration platforms such as Kubernetes to manage external access to services. For example, the NGINX Ingress Controller is configured to listen for Kubernetes Ingress resource definitions and configures its proxy to route traffic, accordingly, enabling users to expose services over the internet with hostname or path-based routing.

According to an embodiment, a cloud firewall filters traffic at the network layer, based on IP ranges, ports, and protocols. Google Cloud Firewall Rules allow administrators to define policies that permit or deny ingress and egress traffic to specific VM instances, Kubernetes nodes, and the like.

In some embodiments, a Web Application Firewall (WAF) is deployed to protect against application-layer threats by inspecting HTTP traffic for common vulnerabilities such as SQL injection, cross-site scripting, and the like. Cloudflare WAF, for example, provides customizable rulesets to block malicious payloads before they reach backend services.

In an embodiment, any of the components listed above are optionally configured to deploy thereon a sensor 212. In some embodiments, the sensor 212 is configured to detect runtime data, for example over an eBPF protocol. In certain embodiments, the sensor 212 is configured to detect network traffic data, such as incoming network traffic (ingress) and outgoing network traffic (egress).

In certain embodiments, for example where a third party appliance is deployed as part of the cloud native router 130, a sensor 212 cannot be deployed thereon, as the appliance is immutable. According to an embodiment, such an appliance is configured to generate a configuration log, including outputting routing rules. In some embodiments, such an appliance is configured to generate an event log and store the event log locally on a disk of the software appliance.

According to an embodiment, an inspection environment 220 is configured to inspect the cloud computing environment 210 for cybersecurity threats, cybersecurity issues, cybersecurity risks, malware, vulnerabilities, misconfigurations, exposures, a combination thereof, and the like. In an embodiment, the inspection environment 220 includes an inspection controller 232, an inspector 234, an active inspector 238, a security database 236, a combination thereof, and the like.

In an embodiment, an inspection controller 232 is configured to initiate inspection of the cloud computing environment 210. According to an embodiment, the inspection controller 232 is configured to detect resources (such as the router 130) in the cloud computing environment 210 and determine which resources, and at what frequency, should be inspected.

In some embodiments, the inspection controller 232 is configured to provision inspector workloads, such as inspector 234, active inspector 238, and the like. In an embodiment, the inspector 234 is configured to inspect a disk, a resource, and the like, for a cybersecurity object. In an embodiment, a cybersecurity object is a code object, a file, a folder, a filesystem, an application, an operating system, a binary, a library, a secret, a key, a certificate, a password, various combinations thereof, and the like. In an embodiment, the cybersecurity object indicates a cybersecurity threat, risk, etc.

According to an embodiment, the inspection controller 232 is configured to initiate agentless inspection of a router 130. For example, in an embodiment, the inspection controller 232 is configured to detect a disk, a volume, and the like, associated with the router 130, generate an inspectable disk therefrom, provision an inspector 234, and assign the inspector 234 to inspect the inspectable disk.

In an embodiment, an inspectable disk is generated based on a copy, a clone, a snapshot (which is then mounted as a volume prior to inspection), a combination thereof, and the like. According to an embodiment, an inspector 234 is configured to access the inspectable disk and detect thereon a configuration file, a network routing table, a local network log, a combination thereof, and the like. In an embodiment, network routing data, firewall rules, network events, and the like, are extracted from the inspectable disk and stored on a security database 236.

In some embodiments, the inspector 234 is configured to inspect the inspectable disk to detect a code object. In an embodiment, the inspector 234 is configured to initiate static analysis on the disk, on code objects detected on the disk, on binaries, and the like. In some embodiments, the inspector is configured to detect API endpoints based on static analysis of the disk. For example, an API endpoint is detectable in code of an application. In some embodiments, an API endpoint, such as a private API endpoint, is detected based on runtime data detected by the sensor 212.

According to an embodiment, an active inspector 238 is configured to receive an API path, including an API endpoint, and generate an access instruction which is executed over a network path, to determine if the API endpoint is an exposed API endpoint. In some embodiments, the access instruction attempts to trigger an API call.

In certain embodiments, detections generated by the inspector 234, runtime data received from the sensor 212, results of active inspection, and the like, are stored in a security database 236. In an embodiment, the security database 236 is implemented as a tabular database, a columnar database, a graph database, a combination thereof, and the like.

In an embodiment, the security database 236 includes a representation of the computing environment 210. In certain embodiments, the representation is generated based on a unified data schema, which allows to represent different computing environments across multiple CSPs with a single database schema. According to some embodiments, a representation includes representations of resources, principals, API endpoints, services, enrichments, vulnerabilities, and the like. In some embodiments, representations are connected via a connection, such as an edge in a graph, which indicates a relationship between the objects represented by the representations.

Figure 3:
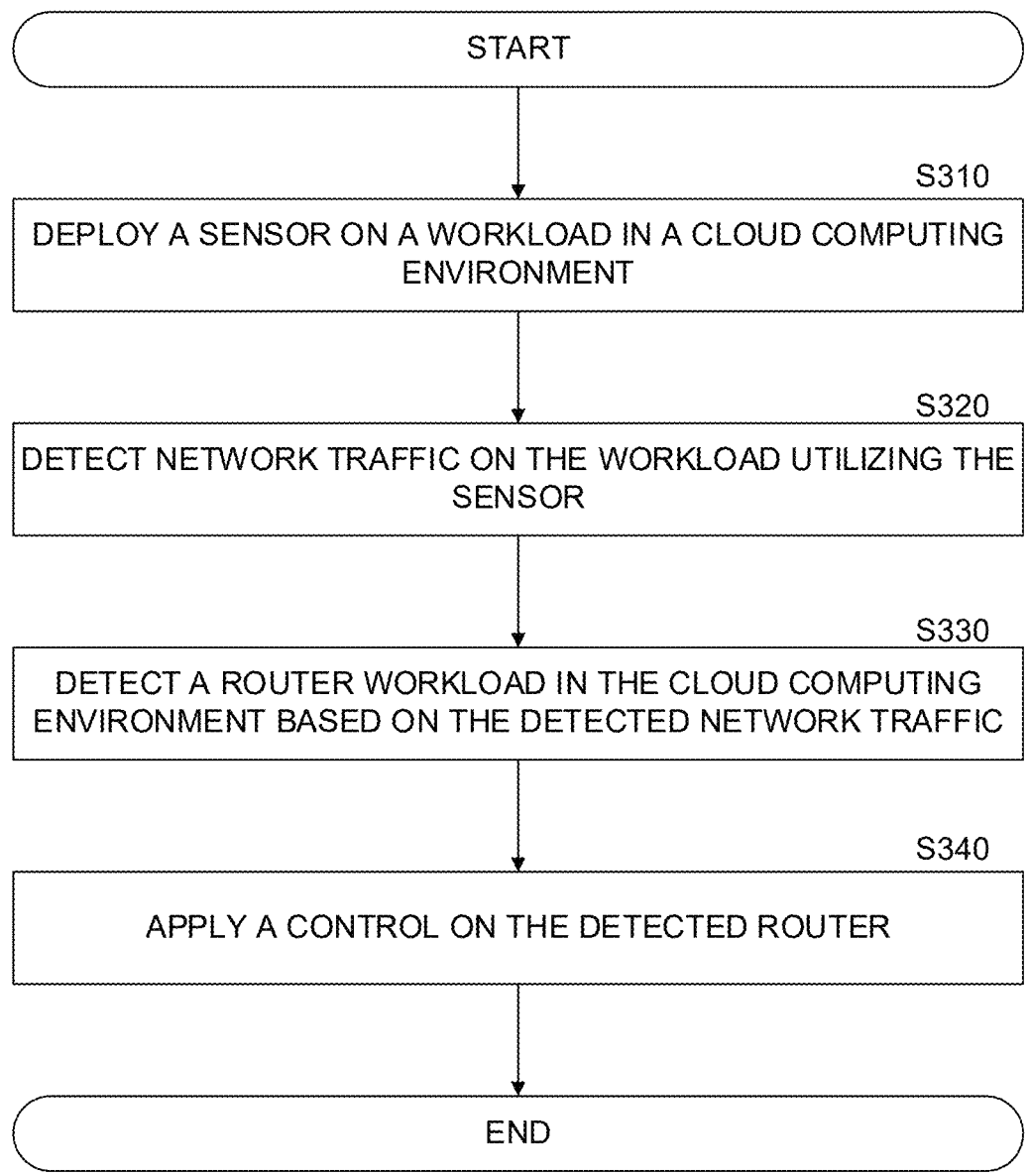
FIG. 3 is an example flowchart of a method for detecting a software router and applying a control thereon, implemented in accordance with an embodiment.

FIG. 3 is an example flowchart of a method for detecting a software router and applying a control thereon, implemented in accordance with an embodiment. In an embodiment, a virtualization deployed in a cloud computing environment includes multiple technologies, applications, and the like. In some embodiments, certain applications, such as NGINX® can function as different components, such as a proxy, a load balancer, etc. For such applications, detecting the application is not enough to determine what the application does. Knowing what the application does allows to exert additional control on the computing environment, and additionally provides context for detecting cybersecurity issues.

At S310, a sensor is deployed on a workload. In an embodiment, an inspection controller is configured to detect workloads in a cloud computing environment, for example through network discovery. For example, discovering virtual machines (EC2 instances) in an AWS environment, includes querying the AWS EC2 API using tools like the AWS CLI, SDKs, infrastructure management systems, and the like. For example, using the DescribeInstances API call, returns metadata such as instance IDs, IP addresses, tags, availability zones, and instance states. Using the AWS CLI, a command such as aws ec2 describe-instances retrieves this data, and filters can refine results, for example, by tag, instance state, and the like.

In an embodiment, deploying a sensor includes configuring a workload to execute a sensor application which is a persistent passive monitoring software, such as a monitoring debugger, which is configured to read runtime events. For example, in an embodiment, a sensor is configured to detect runtime events on an eBPF (Extended Berkeley Packet Filter) protocol.

At S320, network traffic is detected. In an embodiment, network traffic is detected by the deployed sensor utilizing an eBPF protocol. eBPF is an in-kernel virtual machine that allows executing custom bytecode directly within the Linux kernel at runtime. For network traffic detection, eBPF enables dynamic instrumentation by attaching programs to key kernel hook points without requiring kernel module changes or recompilation. These hooks span various layers of the networking stack, allowing inspection, filtering, and manipulation of packets as they traverse the system.

For example, eBPF can be bound to the XDP (express Data Path) layer, which is located at the earliest point in the packet processing pipeline, just after a packet is received by the NIC (network interface controller) but before it enters the kernel networking stack. At this point, the sensor is configured to inspect raw packet headers, apply custom logic (i.e., apply a detection), and take action such as passing the packet. In some embodiments, the sensor is configured to drop, redirect, etc., the packet, for example based on a result of applying a detection thereon.

In an embodiment, the sensor is configured to attach to Traffic Control (TC) hooks or socket-level events, allowing for detailed inspection of IP traffic and application-level communication. This granular access enables precise control and visibility over how packets are handled.

At S330, a router workload is detected. In an embodiment, the workload is determined to be a router workload, i.e., a cloud native router, a component thereof, and the like, based on a result of inspection, based on detections by the sensor, a combination thereof, and the like.

For example, in an embodiment, an inspector detects NGINX on an inspectable disk associated with the workload. Furthermore, the sensor detects network traffic which corresponds to the workload being a load balancer. Based on the combination of these detections, the workload is determined to be a router-type workload. In an embodiment, this detection is stored in a security database. In some embodiments, the security database includes a representation of the cloud computing environment.

At S340, a control is applied. In an embodiment, a control, a policy, a rule, and the like, is applied on a representation of the router workload in the security database. For example, in some embodiments, in response to determining that a workload is a router workload, a control is applied on router workload.

In certain embodiments, the control is a network traffic rule. For example, in an embodiment, a network traffic rule is based on network traffic originating from a certain IP address, from a range of IP addresses, from a public IP address, from a static IP address, from a dynamic IP address, a combination thereof, and the like.

Figure 4:
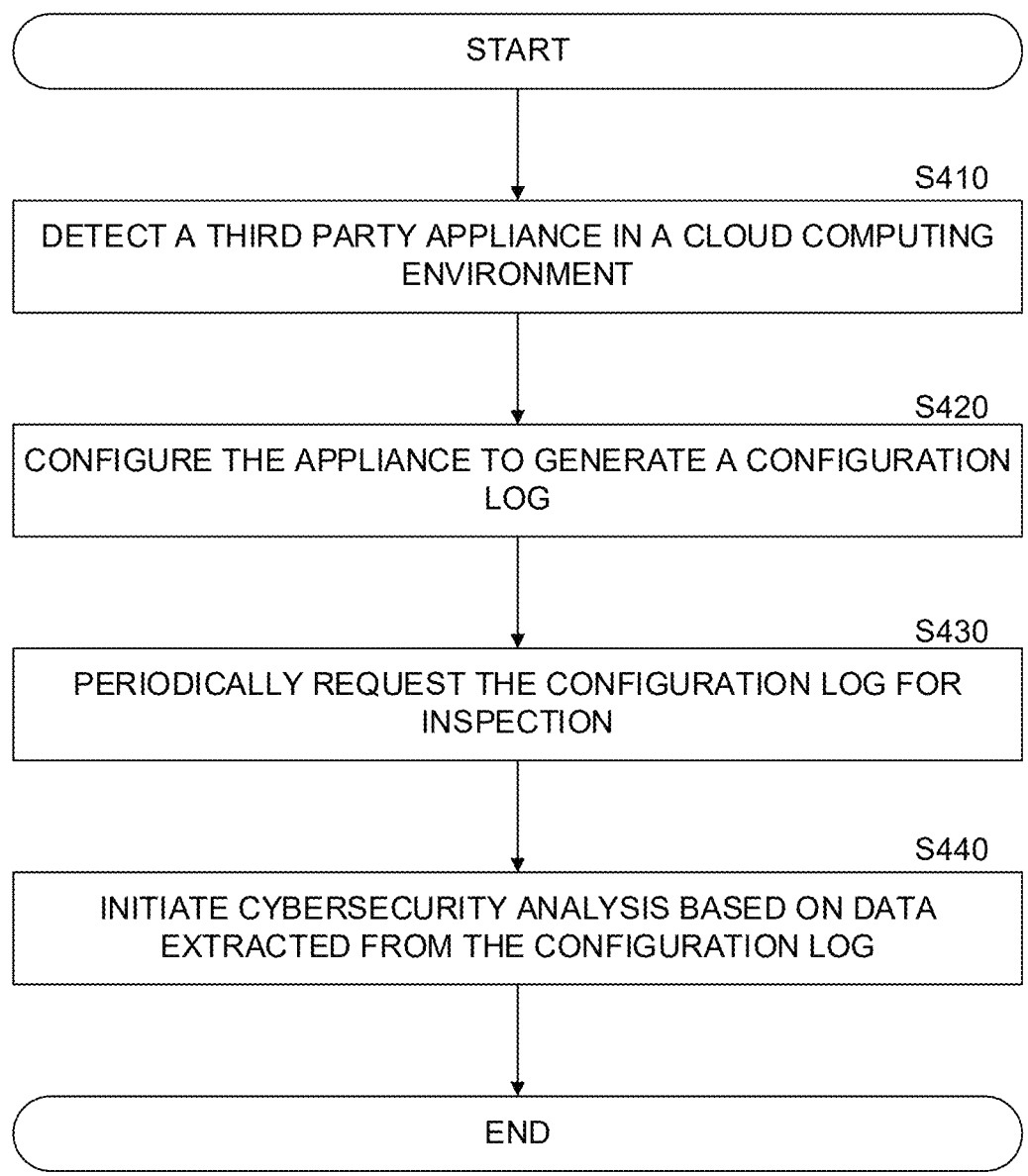
FIG. 4 is an example flowchart of a method for inspecting a third party routing appliance in a cloud computing environment, implemented in accordance with an embodiment.

FIG. 4 is an example flowchart of a method for inspecting a third party routing appliance in a cloud computing environment, implemented in accordance with an embodiment.

At S410, a software appliance is detected in a cloud computing environment. In an embodiment, a software appliance is a pre-configured, self-contained software system that bundles an application with its required operating system components, libraries, and dependencies into a single deployable unit.

A software appliance (or simply 'appliance') is designed to operate like a virtual machine or image that can be instantiated directly on a hypervisor or cloud platform, for example packaged as an image format such as an Amazon Machine Image (AMI) in AWS or a VHD in Azure. Unlike traditional software that must be installed and configured manually, a software appliance is intended to be turnkey, such that it can be launched and its functionality is immediately accessible without manual integration or setup.

In a cloud computing environment, software appliances may be utilized for network functions (such as firewalls, VPNs, load balancers, and the like), monitoring tools, specialized services (such as databases, analytics platforms, etc.). A software appliance is often deployed from cloud marketplaces, such as AWS Marketplace or Azure Marketplace, where vendors (i.e., third parties) provide hardened, optimized images designed to run specific software stacks in an isolated, reproducible environment.

According to an embodiment, detecting software appliances in a cloud computing environment includes analyzing metadata and configuration of running virtual machines, instances, and the like. In an embodiment, this further includes querying the cloud provider's APIs to retrieve attributes such as the image ID, image name, tags, and the like.

In some embodiments, for example where the image is associated with a known vendor, labeled with specific descriptors indicating a marketplace, tagged with a virtual appliance source, etc., the workload can be identified as a software appliance. In AWS, for example, calling the DescribeInstances API and examining the ImageId or associated tags can reveal whether the instance originated from a marketplace appliance, such as a Fortinet NGFW or an ElasticSearch stack.

In certain embodiments, detection includes inspecting the running services, processes, and the like within the instance, for example by the sensor. In various embodiments, an inspector is configured to check for installed packages, and an active inspector is configured to query endpoints of the instance.

At S420, a log is generated. In an embodiment, the software appliance is configured to generate an activity log. In some embodiments, the software appliance is configured to generate the activity log based on a predetermined format. According to an embodiment, the software appliance is configured to generate a routing table, routing rules, a configuration file, a combination thereof, and the like.

In certain embodiments, the software appliance is configured to generate the log, the data, and the like, periodically, continuously, etc.

At S430, the log is requested. In an embodiment, an inspector, inspection controller, and the like, are configured to periodically request the log, the configuration data, a combination thereof, and the like.

In an embodiment, requesting the log includes generating an inspectable disk based on a disk of the software appliance. According to an embodiment, generating an inspectable disk includes generating a copy of a disk, a clone of a disk, a snapshot of the disk (and subsequently mounting the snapshot as a volume), a combination thereof, and the like.

According to some embodiments, an inspector is configured to detect a configuration file, log file, and the like, on the inspectable disk. In an embodiment, the inspector is configured to extract data in a predetermined format from the inspectable disk, which the appliance is configured to write to.

At S440, cybersecurity analysis is initiated. In an embodiment, initiating cybersecurity analysis includes storing the extracted data on a security database, utilizing, for example, a unified data schema. In an embodiment, cybersecurity analysis includes detecting a network traffic pattern, detecting an application deployed on the appliance, analyzing network traffic flow, detecting incoming network traffic, detecting outgoing network traffic, determining source/destination of network traffic, matching the network traffic to VPC flow logs, other appliance logs, a combination thereof, and the like.

In an embodiment, a remediation action, mitigation action, and the like, is initiated based on a result of the cybersecurity analysis. For example, in an embodiment, the security database is configured to apply a policy, a control, a detection rule, a combination thereof, and the like, to the analyzed network traffic.

According to an embodiment, the remediation action includes generating a firewall routing rule, implementing a firewall routing rule, revoking a firewall routing rule, revoking access from a resource, revoking access to a resource, generating an alert, generating a ticket in an issue tracking system, a combination thereof, and the like.

Figure 5:
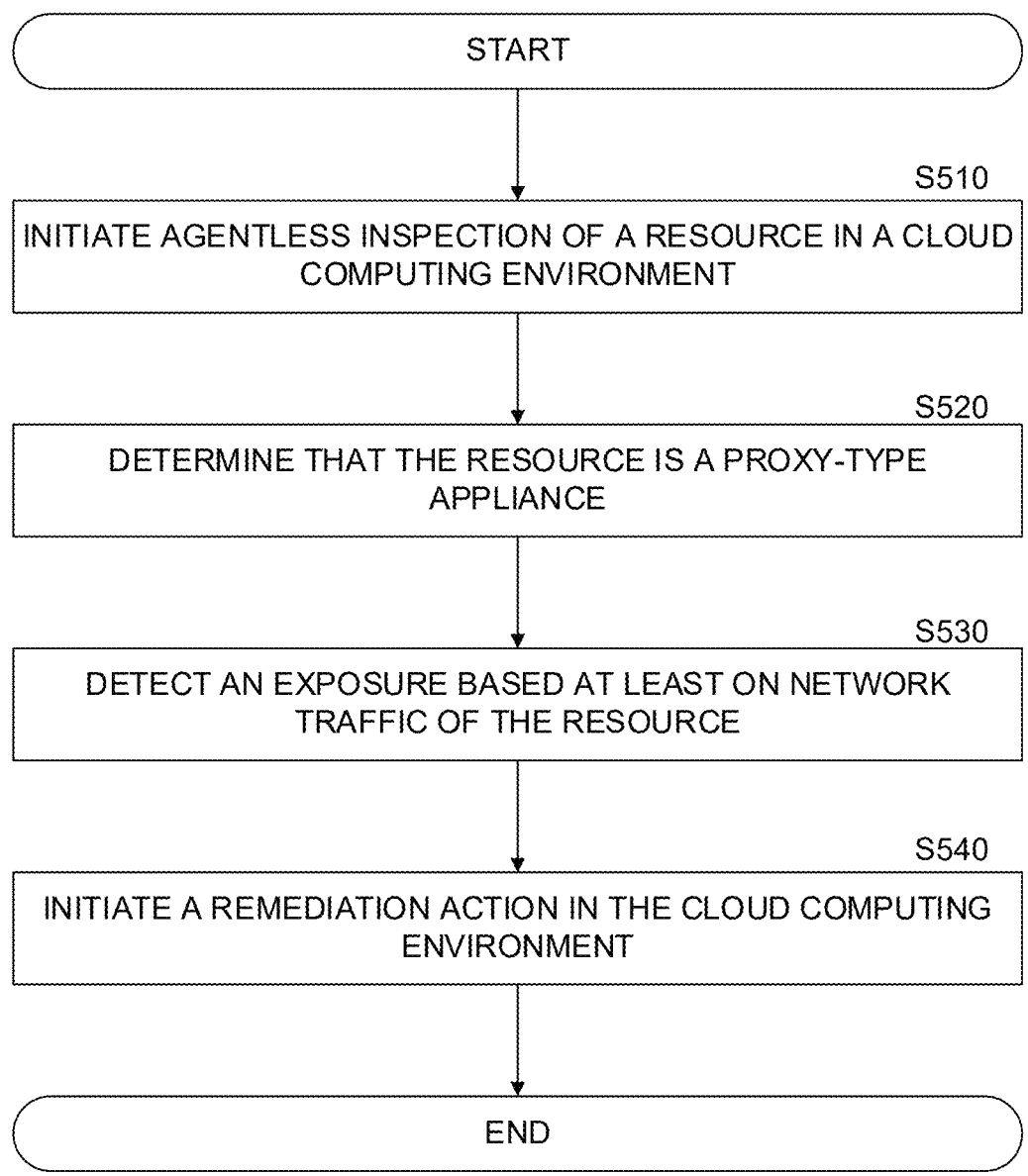
FIG. 5 is an example flowchart of a method for detecting effective exposure related to a proxy-type appliance in a cloud computing environment, implemented in accordance with an embodiment.

FIG. 5 is an example flowchart of a method for detecting effective exposure related to a proxy-type appliance in a cloud computing environment, implemented in accordance with an embodiment.

At S510, agentless inspection of a resource is initiated. In an embodiment, agentless inspection includes generating an inspectable disk from the resource, and inspecting the inspectable disk. According to an embodiment, an inspectable disk is generating by cloning an original disk, copying an original disk, generating a snapshot of an original disk, a combination thereof, and the like.

In an embodiment, generating a clone of an original disk allows instant access to the cloned disk, as opposed to a copy which needs to finish copying all the data from the original disk into the copied disk, or a disk snapshot which requires generating the snapshot, then mounting the snapshot as a volume, and inspecting the volume.

In certain embodiments, agentless inspection is performed by an inspector configured to detect a cybersecurity object, a cybersecurity risk, a vulnerability, an exposure, a misconfiguration, a malware, a combination thereof, and the like.

In an embodiment, a cybersecurity object indicates a cybersecurity issue. In some embodiments, a cybersecurity object is a secret, a certificate, a key, a password, a token, an application, an OS, a binary, a library, a hash value, a code object, a file, a folder, a filesystem, a combination thereof, and the like.

At S520, the resource is determined to be a proxy-type appliance. In an embodiment, a proxy-type appliance is a dedicated system deployed as software (or virtual hardware) that acts as an intermediary for network traffic between clients and services.

In an embodiment, a proxy-type appliance is configured to process network traffic at the transport (Layer 4) or application (Layer 7) layers and is utilized for routing, filtering, inspection, enhancement, and the like, of network communication. In an embodiment, an appliance is configured to enforce security policies, optimize performance, and enable observability without requiring direct modifications to the underlying applications.

In some embodiments, the proxy-type appliance is implemented as a virtual machine, a software container, a combination thereof, and the like, and is placed logically between clients and external (or internal) services. According to an embodiment, a proxy-type appliance is configured as a forward proxy, handling outbound requests from internal clients (or applications) to external destinations (i.e., destinations which are external to the computing environment). This is used for internet access control, URL filtering, malware scanning, and anonymization. Solutions like Symantec® Secure Web Gateway, Zscaler® Internet Access, Squid Proxy®, and the like, serve this purpose, deployed as part of secure internet egress architectures.

In the role of a reverse proxy, a software appliance sits in front of backend services, accepting inbound traffic on their behalf. According to an embodiment, a proxy-type appliance is configured to perform functions such as SSL/TLS termination, HTTP header Microsoft® Azure Application Gateway. These are used in web-facing cloud deployments to manage and secure traffic to microservices, APIs, monolithic web applications, and the like.

In some embodiments, proxy-type appliances incorporate features like deep packet inspection (DPI), intrusion detection/prevention (IDS/IPS), data loss prevention (DLP), and web application firewall (WAF) capabilities. For example, Fortinet® FortiProxy, Palo Alto Networks® VM-Series, and Cloudflare® Magic WAN are such solutions.

In an embodiment, a service mesh technology, such as Istio® or Linkerd®, utilize lightweight proxy components such as Envoy® as sidecars within Kubernetes® Pods. These proxies provide application-aware routing, telemetry, and zero-trust security features inside distributed, container-based environments.

According to an embodiment, a resource is determined to be a proxy-type appliance based on detecting an aforementioned technology on a disk of the resource. In some embodiments, network traffic to/from the resource is also inspected to determine what the appliance actually does in practice. This is useful where an appliance can be configured to perform more than one function, and it is desirable to determine which of the functions the appliance is actually configured to perform and which function is performed in practice in the environment.

For example, in an embodiment, it is desirable to determine if an appliance is configured to provide multiple functionalities, while in practice only a single functionality is utilized in practice by the environment. By allowing functionalities which are not intended to be utilized, a cybersecurity risk is posed.

At S530, an exposure is detected. In an embodiment, an exposure is detected based on network traffic of the resource. For example, in an embodiment, the proxy-type appliance is configured to forward certain network traffic to a private API endpoint. Where the resource accepts external network traffic and forwards it to the private API endpoint, the private API endpoint is exposed to external network traffic, posing a cybersecurity risk.

In an embodiment, network traffic logs are collected from an EDR tool, a load balancer, a traffic log, via agentless collection (such as described in more detail in FIG. 4 above), a combination thereof, and the like.

In some embodiments, exposure of a workload, a resource, and the like, is determined based on a combination of the network traffic logs and the application, technology, etc., which is detected on the disk of the resource.

Prior solutions can miss this type of exposure, as they do not always recognize what an application does. For example, detecting that network traffic is incoming to a load balancer is not enough to detect exposure, as the network traffic is redeployed to its destination in the internal network. A load balancer is authorized to communicate with a service, and the load balancer is authorized to communicate with an external network. Without analyzing the network traffic it would not be apparent that what the load balancer is communicating to the service originated from an external network, which means that the service is effectively exposed.

Such a detection is even less straightforward without understanding what technology, application, etc., is actually running on any particular resource. However, by combining agentless inspection with network logs effective exposure is detected, allowing to remediate such exposures.

At S540, a remediation action is initiated. In an embodiment, the remediation action is initiated in a cloud plane, in a data plane, a combination thereof, and the like, of a cloud computing environment.

According to an embodiment, the remediation action includes revoking access to a resource, revoking access from a resource, updating a firewall routing rule, generating a firewall routing rule, implementing a firewall routing rule, dynamically changing network traffic flow rules, a combination thereof, and the like.

Figure 6:
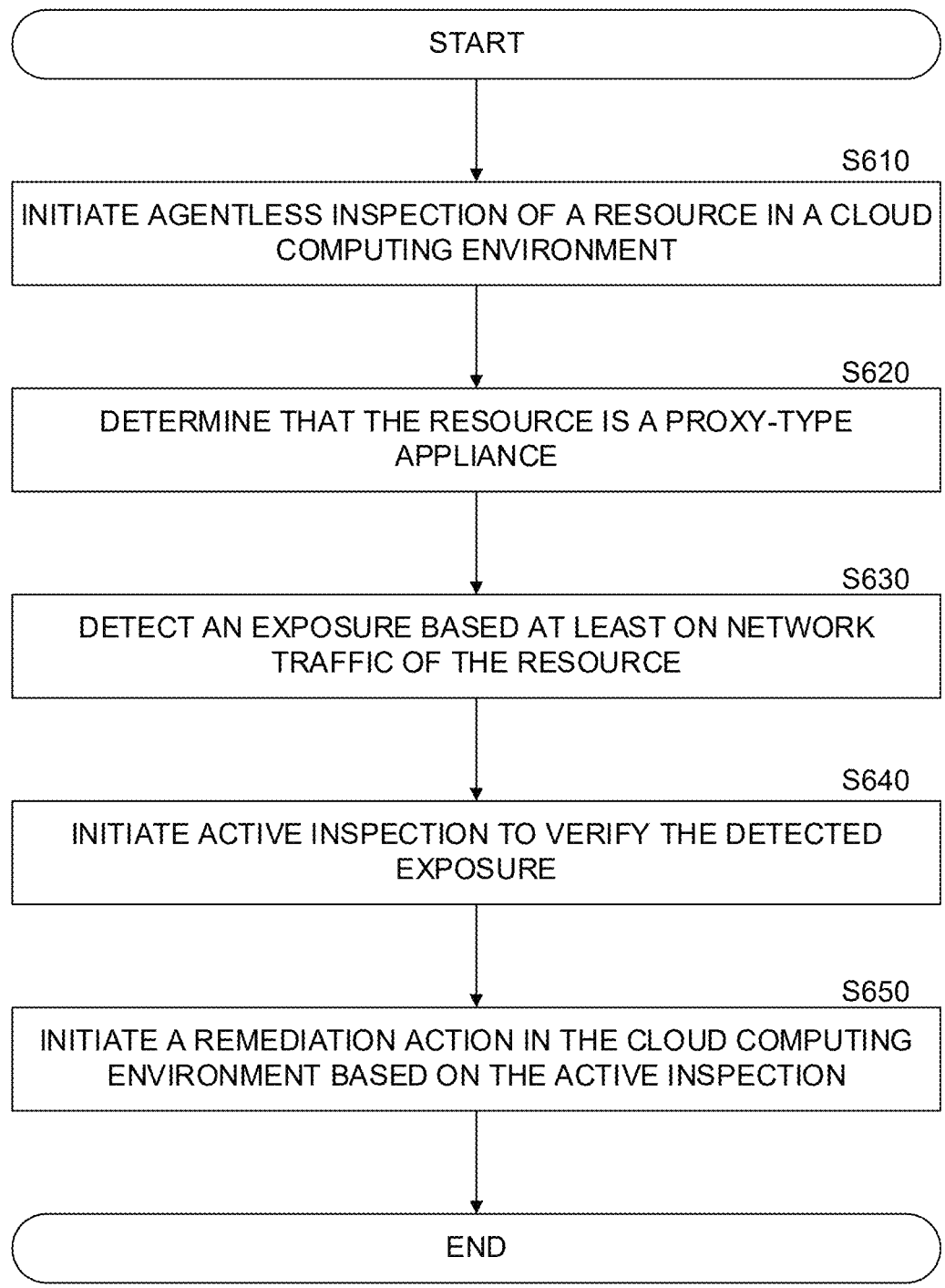
FIG. 6 is an example flowchart of a method for verification of an exposed network path from a software router, implemented according to an embodiment.

FIG. 6 is an example flowchart of a method for verification of an exposed network path from a software router, implemented according to an embodiment.

At S610, agentless inspection of a resource is initiated. In an embodiment, agentless inspection includes generating an inspectable disk from the resource, and inspecting the inspectable disk. According to an embodiment, an inspectable disk is generating by cloning an original disk, copying an original disk, generating a snapshot of an original disk, a combination thereof, and the like.

In an embodiment, generating a clone of an original disk allows instant access to the cloned disk, as opposed to a copy which needs to finish copying all the data from the original disk into the copied disk, or a disk snapshot which requires generating the snapshot, then mounting the snapshot as a volume, and inspecting the volume.

In certain embodiments, agentless inspection is performed by an inspector configured to detect a cybersecurity object, a cybersecurity risk, a vulnerability, an exposure, a misconfiguration, a malware, a combination thereof, and the like.

In an embodiment, a cybersecurity object indicates a cybersecurity issue. In some embodiments, a cybersecurity object is a secret, a certificate, a key, a password, a token, an application, an OS, a binary, a library, a hash value, a code object, a file, a folder, a filesystem, a combination thereof, and the like.

At S620, the resource is determined to be a proxy-type appliance. In an embodiment, a proxy-type appliance is a dedicated system deployed as software (or virtual hardware) that acts as an intermediary for network traffic between clients and services.

In an embodiment, a proxy-type appliance is configured to process network traffic at the transport (Layer 4) or application (Layer 7) layers and is utilized for routing, filtering, inspection, enhancement, and the like, of network communication. In an embodiment, an appliance is configured to enforce security policies, optimize performance, and enable observability without requiring direct modifications to the underlying applications.

In some embodiments, the proxy-type appliance is implemented as a virtual machine, a software container, a combination thereof, and the like, and is placed logically between clients and external (or internal) services. According to an embodiment, a proxy-type appliance is configured as a forward proxy, handling outbound requests from internal clients (or applications) to external destinations (i.e., destinations which are external to the computing environment). This is used for internet access control, URL filtering, malware scanning, and anonymization. Solutions like Symantec® Secure Web Gateway, Zscaler® Internet Access, Squid Proxy®, and the like, serve this purpose, deployed as part of secure internet egress architectures.

In the role of a reverse proxy, a software appliance sits in front of backend services, accepting inbound traffic on their behalf. According to an embodiment, a proxy-type appliance is configured to perform functions such as SSL/TLS termination, HTTP header Microsoft® Azure Application Gateway. These are used in web-facing cloud deployments to manage and secure traffic to microservices, APIs, monolithic web applications, and the like.

In some embodiments, proxy-type appliances incorporate features like deep packet inspection (DPI), intrusion detection/prevention (IDS/IPS), data loss prevention (DLP), and web application firewall (WAF) capabilities. For example, Fortinet® FortiProxy, Palo Alto Networks® VM-Series, and Cloudflare® Magic WAN are such solutions.

In an embodiment, a service mesh technology, such as Istio® or Linkerd®, utilize lightweight proxy components such as Envoy® as sidecars within Kubernetes® Pods. These proxies provide application-aware routing, telemetry, and zero-trust security features inside distributed, container-based environments.

According to an embodiment, a resource is determined to be a proxy-type appliance based on detecting an aforementioned technology on a disk of the resource. In some embodiments, network traffic to/from the resource is also inspected to determine what the appliance actually does in practice. This is useful where an appliance can be configured to perform more than one function, and it is desirable to determine which of the functions the appliance is actually configured to perform and which function is performed in practice in the environment.

For example, in an embodiment, it is desirable to determine if an appliance is configured to provide multiple functionalities, while in practice only a single functionality is utilized in practice by the environment. By allowing functionalities which are not intended to be utilized, a cybersecurity risk is posed.

At S630, an exposure is detected. In an embodiment, an exposure is detected based on network traffic of the resource. For example, in an embodiment, the proxy-type appliance is configured to forward certain network traffic to a private API endpoint. Where the resource accepts external network traffic and forwards it to the private API endpoint, the private API endpoint is exposed to external network traffic, posing a cybersecurity risk.

In an embodiment, network traffic logs are collected from an EDR tool, a load balancer, a traffic log, via agentless collection (such as described in more detail in FIG. 4 above), a combination thereof, and the like.

In some embodiments, exposure of a workload, a resource, and the like, is determined based on a combination of the network traffic logs and the application, technology, etc., which is detected on the disk of the resource.

Prior solutions can miss this type of exposure, as they do not always recognize what an application does. For example, detecting that network traffic is incoming to a load balancer is not enough to detect exposure, as the network traffic is redeployed to its destination in the internal network. A load balancer is authorized to communicate with a service, and the load balancer is authorized to communicate with an external network. Without analyzing the network traffic it would not be apparent that what the load balancer is communicating to the service originated from an external network, which means that the service is effectively exposed.

Such a detection is even less straightforward without understanding what technology, application, etc., is actually running on any particular resource. However, by combining agentless inspection with network logs effective exposure is detected, allowing to remediate such exposures.

At S640, active inspection is initiated. In an embodiment, a detected exposure is a potential exposure. For example, detecting that a first network path potentially exposes a resource (e.g., internal private API endpoint) may be one of many network paths that expose the resource.

According to an embodiment, active inspection is initiated to verify that a network path provides, in practice, exposure from an external network. In an embodiment, an active inspector is configured to receive a potential exposure network path, a portion thereof, and the like, and generate therefrom a network access instruction.

In some embodiments, an active inspector is configured to generate a plurality of network access instructions, for example based on a plurality of APIs. In an embodiment, the presence of a first private API endpoint might indicate that a second private API endpoint exists for the same application, similar application, etc., for which an effective exposure has not been determined. In such embodiments, it is advantageous to verify the potential effective exposure to determine where the effective exposure is real or not.

In an embodiment, the active inspector is configured to generate the access instruction and implement it through an external network, through a proxy server, through a plurality thereof, and the like.

In some embodiments, the active inspector is configured to generate a plurality of access instructions, each with a different network path, a different port, a different source IP address, various combinations thereof, and the like.

At S650, a remediation action is initiated. In an embodiment, the remediation action is initiated in a cloud plane, in a data plane, a combination thereof, and the like, of a cloud computing environment. In some embodiments, the remediation action is initiated on an object of a network path in response to determining that the network path is an exposure path (i.e., a verified detected exposure).

According to an embodiment, the remediation action includes revoking access to a resource, revoking access from a resource, updating a firewall routing rule, generating a firewall routing rule, implementing a firewall routing rule, dynamically changing network traffic flow rules, a combination thereof, and the like.

Figure 7:
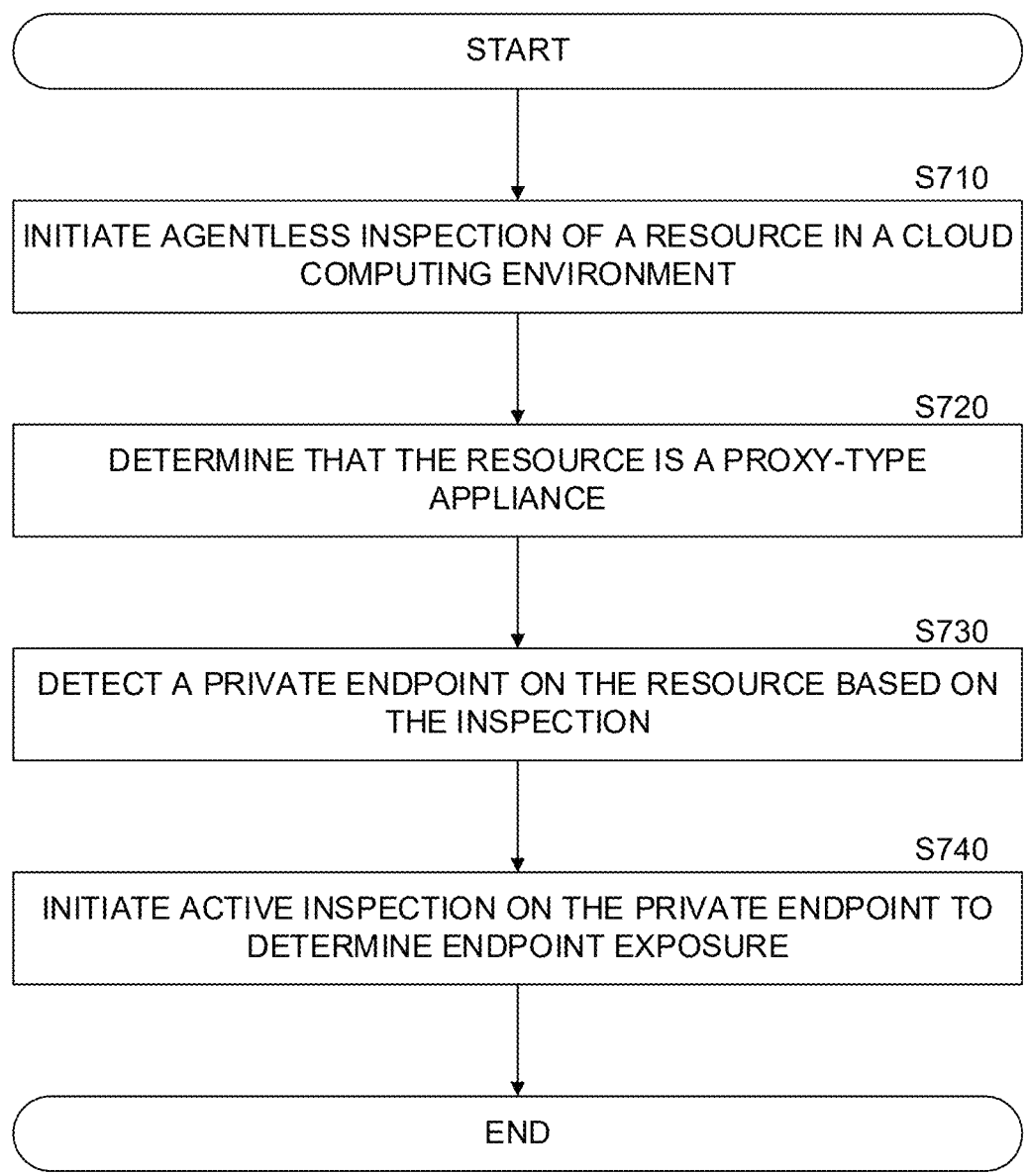
FIG. 7 is an example flowchart of a method for detecting a private endpoint on a proxy-type appliance in a cloud computing environment, implemented according to an embodiment.

FIG. 7 is an example flowchart of a method for detecting a private endpoint on a proxy-type appliance in a cloud computing environment, implemented according to an embodiment.

At S710, agentless inspection of a resource is initiated. In an embodiment, agentless inspection includes generating an inspectable disk from the resource, and inspecting the inspectable disk. According to an embodiment, an inspectable disk is generating by cloning an original disk, copying an original disk, generating a snapshot of an original disk, a combination thereof, and the like.

In an embodiment, generating a clone of an original disk allows instant access to the cloned disk, as opposed to a copy which needs to finish copying all the data from the original disk into the copied disk, or a disk snapshot which requires generating the snapshot, then mounting the snapshot as a volume, and inspecting the volume.

In certain embodiments, agentless inspection is performed by an inspector configured to detect a cybersecurity object, a cybersecurity risk, a vulnerability, an exposure, a misconfiguration, a malware, a combination thereof, and the like.

In an embodiment, a cybersecurity object indicates a cybersecurity issue. In some embodiments, a cybersecurity object is a secret, a certificate, a key, a password, a token, an application, an OS, a binary, a library, a hash value, a code object, a file, a folder, a filesystem, a combination thereof, and the like.

At S720, the resource is determined to be a proxy-type appliance. In an embodiment, a proxy-type appliance is a dedicated system deployed as software (or virtual hardware) that acts as an intermediary for network traffic between clients and services.

In an embodiment, a proxy-type appliance is configured to process network traffic at the transport (Layer 4) or application (Layer 7) layers and is utilized for routing, filtering, inspection, enhancement, and the like, of network communication. In an embodiment, an appliance is configured to enforce security policies, optimize performance, and enable observability without requiring direct modifications to the underlying applications.

In some embodiments, the proxy-type appliance is implemented as a virtual machine, a software container, a combination thereof, and the like, and is placed logically between clients and external (or internal) services. According to an embodiment, a proxy-type appliance is configured as a forward proxy, handling outbound requests from internal clients (or applications) to external destinations (i.e., destinations which are external to the computing environment). This is used for internet access control, URL filtering, malware scanning, and anonymization. Solutions like Symantec® Secure Web Gateway, Zscaler® Internet Access, Squid Proxy®, and the like, serve this purpose, deployed as part of secure internet egress architectures.

In the role of a reverse proxy, a software appliance sits in front of backend services, accepting inbound traffic on their behalf. According to an embodiment, a proxy-type appliance is configured to perform functions such as SSL/TLS termination, HTTP header rewriting, load balancing, authentication enforcement, caching, and application-layer security. Examples include NGINX®, F5® BIG-IP, AWS Application Load Balancer, and Microsoft® Azure Application Gateway. These are used in web-facing cloud deployments to manage and secure traffic to microservices, APIs, monolithic web applications, and the like.

In some embodiments, proxy-type appliances incorporate features like deep packet inspection (DPI), intrusion detection/prevention (IDS/IPS), data loss prevention (DLP), and web application firewall (WAF) capabilities. For example, Fortinet® FortiProxy, Palo Alto Networks® VM-Series, and Cloudflare® Magic WAN are such solutions.

In an embodiment, a service mesh technology, such as Istio® or Linkerd®, utilize lightweight proxy components such as Envoy® as sidecars within Kubernetes® Pods. These proxies provide application-aware routing, telemetry, and zero-trust security features inside distributed, container-based environments.

According to an embodiment, a resource is determined to be a proxy-type appliance based on detecting an aforementioned technology on a disk of the resource. In some embodiments, network traffic to/from the resource is also inspected to determine what the appliance actually does in practice. This is useful where an appliance can be configured to perform more than one function, and it is desirable to determine which of the functions the appliance is actually configured to perform and which function is performed in practice in the environment.

For example, in an embodiment, it is desirable to determine if an appliance is configured to provide multiple functionalities, while in practice only a single functionality is utilized in practice by the environment. By allowing functionalities which are not intended to be utilized, a cybersecurity risk is posed.

At S730, a private endpoint is detected on the resource. In an embodiment, a private endpoint in a cloud computing context refers to a network interface that connects a private IP address from a virtual network (such as an AWS VPC or Azure VNet) to a cloud service, allowing that service to be accessed entirely over the internal, isolated network fabric without traversing an external network, such as the public internet. According to an embodiment, utilizing a private endpoint ensures that communication between services remains confined to the provider's secure backbone infrastructure, which minimizes exposure to external threats, reduces latency, and simplifies compliance requirements.

For example, in AWS, private endpoints are implemented through VPC endpoints or Interface Endpoints, which assign a private IP to the cloud service's entry point. As another example, in Azure, Private Link provides the equivalent functionality by mapping a service to a private IP within a customer's subnet. These endpoints are tightly scoped to a network boundary and can be controlled using standard security tools such as security groups, network ACLs, and DNS policies.

Exposing private endpoints through a cloud-native router, particularly one configured to manage both public and internal routes, introduces significant security risks and defeats the purpose of private networking. The core principle of private endpoints is isolation; they are not intended to be routable from the public internet or even from other untrusted network zones. Where a router, ingress controller, or API gateway unintentionally exposes these endpoints via public-facing rules, NAT configurations, or misapplied policies, it opens the door to unauthorized access, lateral movement by attackers, inadvertent data leaks, and the like.

For example, if a Kubernetes Ingress controller is configured to forward traffic to a private endpoint without applying strict routing and access controls, it could enable internet users to access internal cloud services originally meant to be isolated. This violates the zero-trust model and increases the attack surface, making it easier for adversaries to scan, exploit, or pivot into more sensitive parts of the network.

In an embodiment, detecting a private endpoint includes network-level detection, initiated by scanning subnet ranges and identifying interfaces, DNS entries resolving to private IPs that serve managed services, and the like. In some embodiments, DNS queries within a VPC (or VNet) may return private IP addresses instead of public service endpoints when private endpoint resolution is enabled, thus allowing detection.

At S740, active inspection is initiated. In an embodiment, active inspection is initiated to determine if the private endpoint is an exposed endpoint. By determining that a resource functions as a proxy-type (i.e., it forwards network traffic) and that communication is possible to a private endpoint, a potential network path is generated by an active inspector.

In an embodiment, the active inspector is further configured to generate an access instruction, and initiate the access instruction on a network path which includes at least a portion of a network which is external (i.e., an external network) to the internal network (i.e., the cloud computing environment) in which the private API endpoint is deployed.

In an embodiment, active inspection returns a result. For example, active inspection can determine where a resource is exposed based on a response received from the resource over the network path. In an embodiment, a remediation action is initiated in response to determining that the private endpoint is an exposed endpoint.

Figure 8:
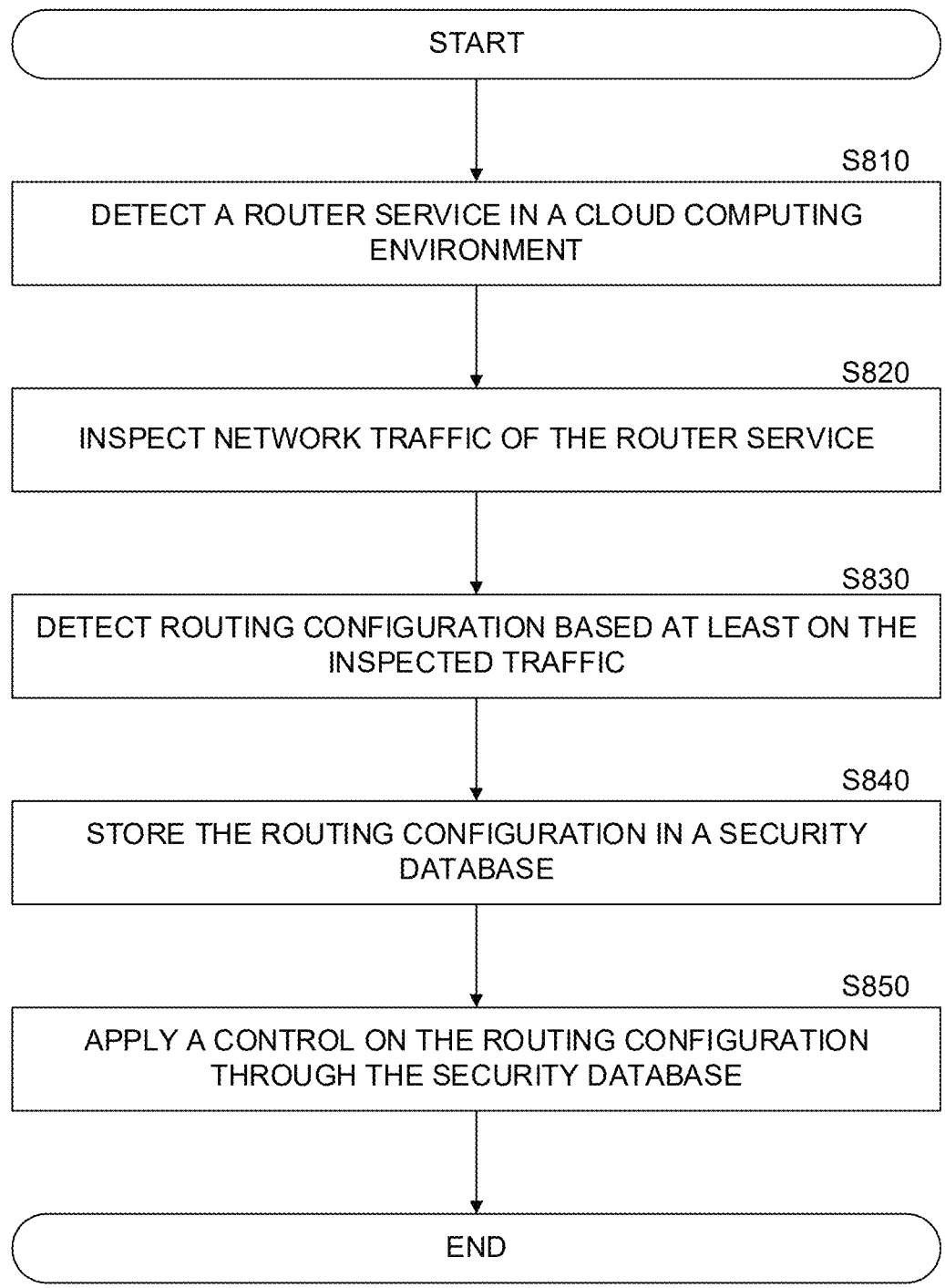
FIG. 8 is an example flowchart of a method for representing routing configuration in a security database and applying a control thereon, implemented according to an embodiment.

FIG. 8 is an example flowchart of a method for representing routing configuration in a security database and applying a control thereon, implemented according to an embodiment.

At S810, a router service is detected. In an embodiment, a cloud-native router service is a distributed, software-defined component that handles application-layer routing, traffic control, and service discovery in cloud-native environments. It dynamically directs traffic between microservices or from external clients to internal workloads based on rules defined in platforms like Kubernetes or service meshes. Unlike traditional hardware routers, it operates at Layer 7, enabling host- and path-based routing, SSL termination, load balancing, and policy enforcement within cloud infrastructure.

For example, utilizing a Kubernetes platform, an Ingress Controller (e.g., NGINX, Traefik, HAProxy, etc.) translates ingress resources into HTTP routing configurations. For example, an AWS EKS cluster is configured to deploy an ALB Ingress Controller, where the router service is backed by an Application Load Balancer. The controller manages route definitions via Kubernetes Ingress resources, automatically configuring the ALB to handle external HTTP(S) traffic.

In some embodiments, detection of a cloud-native router involves querying the orchestration layer and associated cloud infrastructure. For example, in a Kubernetes platform, commands such as kubectl get ingress or kubectl get svc-A allow locating services bound to routing controllers, while reviewing annotations, labels, and the like, reveals their roles. In an embodiment, services such as AWS's ALB, Azure's Application Gateway, or GCP's HTTP(S) Load Balancer are detected by inspecting load balancer resources. In an embodiment, these resources are linked back to a Kubernetes platform via hints such as auto-generated tags, naming conventions, etc.

In service meshes such as Istio, the router function is handled by Envoy proxies and defined through custom resources. In an embodiment, detection includes inspecting the mesh control plane and sidecar deployments.

At S820, network traffic is inspected. In an embodiment, inspecting network traffic includes detecting ingress traffic, detecting egress traffic, a combination thereof, and the like. In an embodiment, network traffic includes a source IP address, a destination IP address, a payload, a payload type, a combination thereof, and the like.

In an embodiment, network traffic is inspected using deep packet inspection (DPI). In some embodiments, a portion of network traffic is inspected utilizing DPI techniques.

At S830, routing configuration is detected. In an embodiment, routing configuration rules are detected based on the inspected network traffic. For example, according to an embodiment, routing configuration rules are inferred based on actual network traffic flow.

In some embodiments, routing configuration is detected based on a routing table. In an embodiment, a firewall, WAF, and the like, is queried to receive therefrom a routing table, routing rules, and the like.

At S840, the routing configuration is stored. In an embodiment, routing configuration is stored on the security database. For example, in some embodiments, the routing configuration is stored as rules, policies, controls, and the like, which are applied on representations of the cloud computing environment. In some embodiments, applying the rules on the representation of the cloud computing environment allows detecting policy violations, rule violations, network exposure, a combination thereof, and the like.

At S850, a control is applied. In an embodiment, the control is applied on the routing configuration stored in the security database. In some embodiments, applying a control on the routing configuration allows to unify routing configuration, routing policies, firewall policies, and the like.

Figure 9:
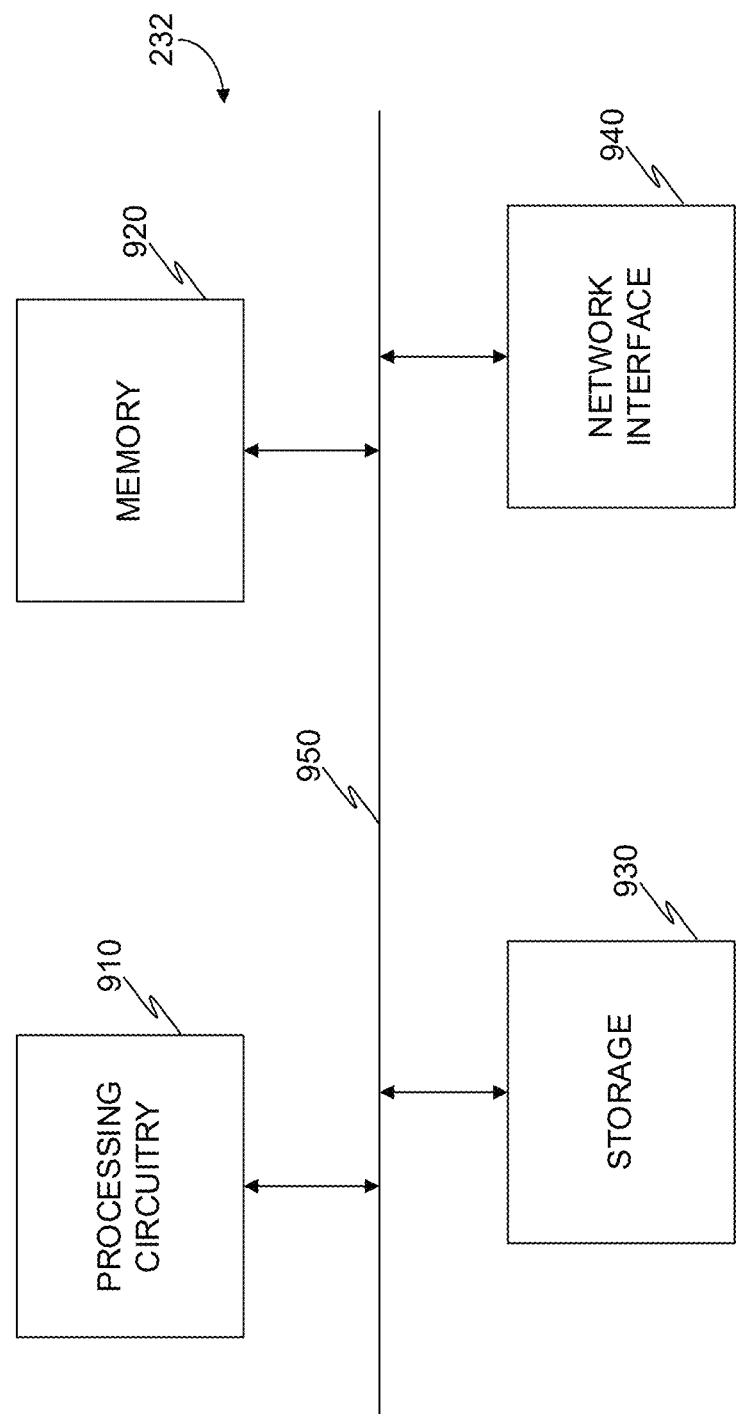
FIG. 9 is an example schematic diagram of an inspection controller according to an embodiment.

FIG. 9 is an example schematic diagram of an inspection controller 232 according to an embodiment. The inspection controller 232 includes, according to an embodiment, a processing circuitry 910 coupled to a memory 920, a storage 930, and a network interface 940. In an embodiment, the components of the inspection controller 232 are communicatively connected via a bus 950.

In certain embodiments, the processing circuitry 910 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 920 is a volatile memory (e.g., random access memory, etc.), a non-volatile memory (e.g., read only memory, flash memory, etc.), a combination thereof, and the like. In some embodiments, the memory 920 is an on-chip memory, an off-chip memory, a combination thereof, and the like. In certain embodiments, the memory 920 is a scratch-pad memory for the processing circuitry 910.

In one configuration, software for implementing one or more embodiments disclosed herein is stored in the storage 930, in the memory 920, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 910, cause the processing circuitry 910 to perform the various processes described herein, in accordance with an embodiment.

In some embodiments, the storage 930 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 940 is configured to provide the inspection controller 232 with communication with, for example, the cloud computing environment 210, according to an embodiment.

It should be understood that the embodiments described herein are not limited to the specific architecture illustrated in FIG. 9, and other architectures may be equally used without departing from the scope of the disclosed embodiments.

Furthermore, in certain embodiments the inspection controller 232, the inspector 234, the security database 236, the active inspector 238, any combination thereof, and the like, may be implemented with the architecture illustrated in FIG. 9. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting effective exposure of private API endpoints in a cloud computing environment, comprising:
inspecting a resource in a cloud computing environment utilizing agentless inspection;
detecting a cybersecurity object on the inspected resource, the cybersecurity object indicating that the resource is a proxy-type appliance;
detecting a private endpoint in the cloud computing environment, wherein the resource is configured to access the private endpoint, and the resource is further configured to access an external network, and wherein the external network is external to the cloud computing environment;
determining that the private endpoint is potentially exposed via a network path which includes at least the resource;
actively inspecting the network path to determine that the private endpoint is exposed to the external network wherein actively inspecting the network path further comprises: generating a network access instruction; executing the network access instruction on a network path including the external network; and determining that the private endpoint is exposed based on a reply received from executing the network access instruction; and
initiating a remediation action based on a result of the active inspection.

2. The method of claim 1, further comprising:
actively inspecting the network path after initiating the remediation action;
determining that the private endpoint is still exposed; and
initiating a second remediation action.

3. The method of claim 1, further comprising:
inspecting the resource for a second cybersecurity object, the second cybersecurity object indicating a cybersecurity risk;
detecting the cybersecurity object; and
initiating the remediation action further based on the cybersecurity risk.

4. The method of claim 1, further comprising:
detecting the private endpoint in a cloud log of the cloud computing environment, wherein the cloud log includes a plurality of event records, and wherein at least an event record includes a network address of the private endpoint.

5. The method of claim 1, further comprising:
detecting in a network log of the cloud computing environment a data record indicating communication between the resource and the private endpoint.

6. The method of claim 1, further comprising:
executing the network access instruction on a plurality of network paths, each including a different external network component.

7. The method of claim 1, further comprising:
determining that the resource is a proxy-type based on detecting the cybersecurity object and further based on detecting a configuration of the proxy-type appliance.

8. A non-transitory computer-readable medium storing a set of instructions for detecting effective exposure of private API endpoints in a cloud computing environment, the set of instructions comprising:
one or more instructions that, when executed by one or more processing circuitries of a device, cause the device to:
inspect a resource in a cloud computing environment utilizing agentless inspection;
detect a cybersecurity object on the inspected resource, the cybersecurity object indicating that the resource is a proxy-type appliance;
detect a private endpoint in the cloud computing environment, wherein the resource is configured to access the private endpoint, and the resource is further configured to access an external network, and wherein the external network is external to the cloud computing environment;
determine that the private endpoint is potentially exposed via a network path which includes at least the resource;
actively inspect the network path to determine that the private endpoint is exposed to the external network; wherein actively inspecting the network path further comprises: generating a network access instruction; executing the network access instruction on a network path including the external network; and determining that the private endpoint is exposed based on a reply received from executing the network access instruction; and
initiate a remediation action based on a result of the active inspection.

9. A system for detecting effective exposure of private API endpoints in a cloud computing environment comprising:
a processing circuitry;
a memory, the memory containing instructions that, when executed by the processing circuitry, configure the system to:
inspect a resource in a cloud computing environment utilizing agentless inspection;
detect a cybersecurity object on the inspected resource, the cybersecurity object indicating that the resource is a proxy-type appliance;
detect a private endpoint in the cloud computing environment, wherein the resource is configured to access the private endpoint, and the resource is further configured to access an external network, and wherein the external network is external to the cloud computing environment;
determine that the private endpoint is potentially exposed via a network path which includes at least the resource;
actively inspect the network path to determine that the private endpoint is exposed to the external network; wherein actively inspecting the network path further comprises: generating a network access instruction; executing the network access instruction on a network path including the external network; and determining that the private endpoint is exposed based on a reply received from executing the network access instruction; and
initiate a remediation action based on a result of the active inspection.

10. The system of claim 9, wherein the memory contains further instructions which when executed by the processing circuitry further configure the system to:
actively inspect the network path after initiating the remediation action;

determine that the private endpoint is still exposed; and
initiate a second remediation action.

11. The system of claim 9, wherein the memory contains further instructions which when executed by the processing circuitry further configure the system to:
    inspect the resource for a second cybersecurity object, the second cybersecurity object indicating a cybersecurity risk;
    detect the cybersecurity object; and
    initiate the remediation action further based on the cybersecurity risk.

12. The system of claim 9, wherein the memory contains further instructions which when executed by the processing circuitry further configure the system to:
    detect the private endpoint in a cloud log of the cloud computing environment, wherein the cloud log includes a plurality of event records, and wherein at least an event record includes a network address of the private endpoint.

13. The system of claim 9, wherein the memory contains further instructions which when executed by the processing circuitry further configure the system to:
    detect in a network log of the cloud computing environment a data record indicating communication between the resource and the private endpoint.

14. The system of claim 9, wherein the memory contains further instructions which when executed by the processing circuitry further configure the system to:
    execute the network access instruction on a plurality of network paths, each including a different external network component.

15. The system of claim 9, wherein the memory contains further instructions which when executed by the processing circuitry further configure the system to:
    determine that the resource is a proxy-type based on detecting the cybersecurity object and further based on detecting a configuration of the proxy-type appliance.

* * * * *